United States Patent
Florindo

(10) Patent No.: US 10,927,700 B2
(45) Date of Patent: Feb. 23, 2021

(54) VARIABLE GEOMETRY ASSEMBLY FOR A TURBOMACHINE AND TURBOMACHINE COMPRISING SAID ASSEMBLY

(71) Applicant: Nuovo Pignone Tecnologie Srl, Florence (IT)

(72) Inventor: Federico Florindo, Florence (IT)

(73) Assignee: NUOVO PIGNONE TECNOLOGIE SRL, Florence (IT)

( * ) Notice: Subject to any disclaimer, the term of this patent is extended or adjusted under 35 U.S.C. 154(b) by 156 days.

(21) Appl. No.: 15/619,841

(22) Filed: Jun. 12, 2017

(65) Prior Publication Data
US 2017/0356301 A1    Dec. 14, 2017

(30) Foreign Application Priority Data
Jun. 13, 2016   (IT) .......................... UA2016A004308

(51) Int. Cl.
*F01D 17/16*    (2006.01)
*F01D 17/14*    (2006.01)
(Continued)

(52) U.S. Cl.
CPC ......... *F01D 17/165* (2013.01); *F01D 17/143* (2013.01); *F02C 6/12* (2013.01);
(Continued)

(58) Field of Classification Search
CPC ........ F01D 17/143; F01D 17/165; F02C 6/12; F04D 29/462; F05D 2220/40; F05D 2240/128
See application file for complete search history.

(56) References Cited

U.S. PATENT DOCUMENTS 3,079,127 A * 2/1963 Rowlett ................ F01D 17/143
 415/48
3,365,120 A * 1/1968 Jassniker .............. F01D 17/143
 415/126

(Continued)

FOREIGN PATENT DOCUMENTS

CN    101634233 B    7/2011
CN    203584478 U    5/2014
(Continued)

OTHER PUBLICATIONS

Italian Search Report and Written Opinion issued in connection with corresponding IT Application No. 102016000060247 dated Feb. 16, 2017.
(Continued)

*Primary Examiner* — Christopher Verdier
(74) *Attorney, Agent, or Firm* — Baker Hughes Patent Org.

(57) ABSTRACT

A variable geometry assembly for modulating a fluid flow in a turbomachine is disclosed. The assembly comprises a first ring having a plurality of first wedge-shaped elements and having an axis, and a second ring having a plurality of second wedge-shaped elements and having an axis. The second ring is substantially coaxial to the first ring. The second wedge-shaped elements co-act with the first wedge-shaped elements. Flow passages are defined between pairs of sequentially arranged first wedge-shaped elements and second wedge-shaped elements. The first ring and the second ring are angularly displaceable one with respect to the other. Moreover, the first ring and the second ring are configured to move axially with respect to one another when the first ring and the second ring are angularly displaced one with respect to the other.

16 Claims, 12 Drawing Sheets

(51) Int. Cl.
*F02C 6/12* (2006.01)
*F04D 29/46* (2006.01)

(52) U.S. Cl.
CPC ........ *F04D 29/462* (2013.01); *F05D 2220/40* (2013.01); *F05D 2240/128* (2013.01)

(56) References Cited

U.S. PATENT DOCUMENTS

| | | | |
|---|---|---|---|
| 5,231,831 A * | 8/1993 | Leavesley | F01D 17/143 |
| | | | 415/157 |
| 6,269,642 B1 | 8/2001 | Arnold et al. | |
| 6,419,464 B1 | 7/2002 | Arnold | |
| 6,672,059 B2 | 1/2004 | Arnold | |
| 6,679,057 B2 | 1/2004 | Arnold | |
| 6,709,232 B1 | 3/2004 | Vogiatzis | |
| 6,726,447 B2 * | 4/2004 | Lutz | F01D 17/143 |
| | | | 415/158 |
| 6,729,134 B2 | 5/2004 | Arnold | |
| 8,061,976 B2 | 11/2011 | Hall | |
| 8,376,695 B2 | 2/2013 | Scholz et al. | |

FOREIGN PATENT DOCUMENTS

| | | |
|---|---|---|
| EP | 1 260 675 A1 | 11/2002 |
| EP | 1 200 713 B1 | 3/2006 |
| WO | 2008/129274 A2 | 10/2008 |
| WO | 2009/115437 A2 | 9/2009 |

OTHER PUBLICATIONS

Extended European Search Report and Opinion issued in connection with corresponding EP Application No. 17175524.2 dated Nov. 13, 2017.

* cited by examiner

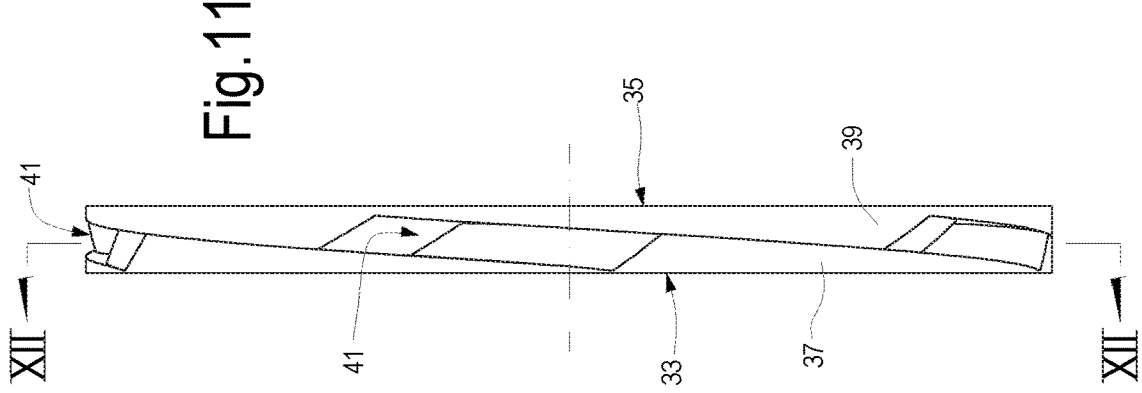
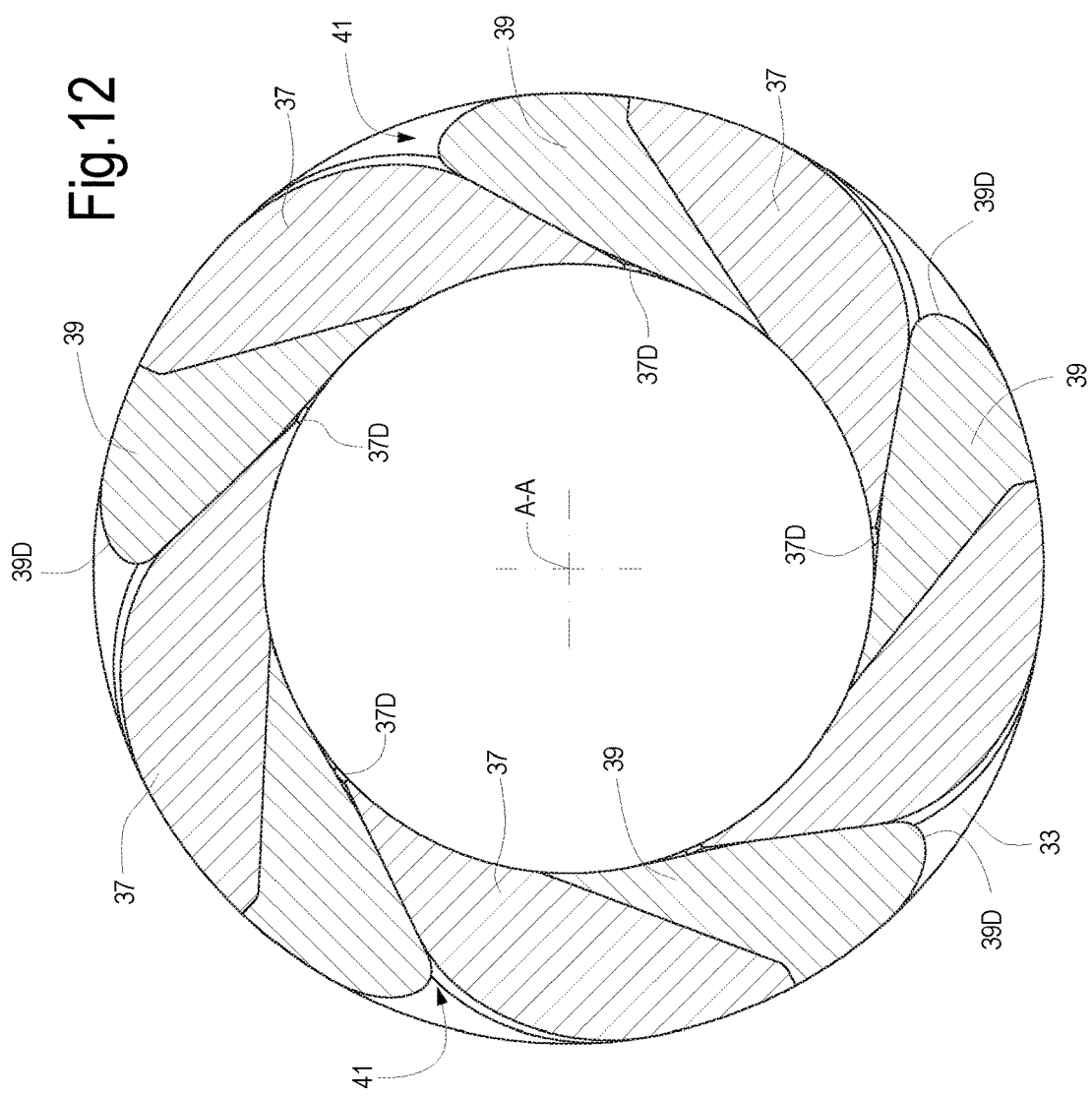

VARIABLE GEOMETRY ASSEMBLY FOR A TURBOMACHINE AND TURBOMACHINE COMPRISING SAID ASSEMBLY

BACKGROUND

The subject matter of the present disclosure relates to turbomachines. Embodiments disclosed herein concern power producing turbomachines, such as centripetal turboexpanders or turbines. Other embodiments relate to power absorbing turbomachines, such as centrifugal compressors.

More specifically, the disclosure concerns improvements to variable geometry members used in such turbomachines to adjust the flow of a fluid processed through the turbomachine.

Radial turboexpanders and turbines are commonly used turbomachines generating useful mechanical power from a flow of pressurized gas. Centripetal expanders and turbines are used to convert pressure energy and heat of a gaseous flow into mechanical energy to drive a load. Centripetal turbines are used for instance in turbocharges for internal combustion engines. Exhaust combustion gas from the combustion chamber of the internal combustion engine is expanded in the centripetal turbine, which in turn drives an intake air compressor. This latter boosts the pressure of intake air before it is mixed with fuel and the air-fuel mixture is finally combusted in the combustion chamber of the internal combustion engine. Turbochargers are nowadays commonly used in automotive applications, as well as in naval engines, to increase the power delivered by the internal combustion engine.

Radial turboexpanders and turbines are also used in applications other than supercharging of internal combustion engines. E.g. radial turboexpanders or turbines are used to drive electric generators or other rotary loads, such as industrial compressors or pumps.

It is often desirable to control the flow of the working gas processed through the radial turbine or turboexpander, to improve efficiency thereof or to control the operation of the turbomachine under variable, off-design operating conditions.

Variable geometry turboexpanders and turbines have been configured to address this need. These variable geometry turbomachines are usually provided with variable nozzle guide vanes, shortly termed variable NGV. The variable nozzle guide vanes are positioned annularly around a turbine inlet. Each vane is hinged around a respective pivoting axis, which is usually parallel to the rotation axis of the turbine impeller. Each pivoting vane is coupled by means of a lever to a rotating ring. The rotation of the ring by means of an actuator causes the vanes to simultaneously pivot around the respective pivoting axes, thus adjusting the throat area of flow passages formed between adjacent vanes, such as to control the working fluid flow through the turbine.

Centrifugal compressors are driven machines used to boost the pressure of a working gas from a suction pressure to a delivery pressure. One or more impellers are arranged for rotation in a casing and are driven into rotation by a driver, such as a gas turbine or an electric motor. Kinetic energy is delivered by the vanes of the rotating impeller to the gas flowing therethrough, such that the gas is accelerated through the impeller. The kinetic energy of the gas radially exiting the impeller is converted into pressure energy in a diffuser arranged annularly around the centrifugal outlet of the impeller. Some known centrifugal compressors are provided with vaned diffusers, i.e. diffusers wherein vanes are arranged, to improve efficiency of the turbomachine.

Variable diffuser vanes are sometimes used to improve efficiency of centrifugal compressors, which are required to operate under variable operating conditions. Similarly to variable nozzle guide vanes, variable diffuser vanes are mounted for rotation around respective pivoting axes. An actuating ring, whereto the variable diffuser vanes are linked through respective levers, causes the vanes to simultaneously pivot around the respective pivoting axes, thus controlling the gas flow passage and adjust the geometry thereof to variable operating conditions.

These known variable geometry mechanisms are complex to manufacture and difficult to assemble, due to the large number of components, they are formed of. Vanes, levers and other multiple connections linking the vanes to the actuator are prone to vibrations and failure. Link clearances cause backlash in the kinematic connections between the actuator and the vanes.

A need therefore exists for a more efficient variable geometry member suitable for adjusting the operating conditions of a turbomachine.

SUMMARY OF THE INVENTION

According to one aspect, a variable geometry assembly is disclosed, for modulating a fluid flow in a turbomachine. The variable geometry assembly comprises a first ring and a second ring. The first ring and the second ring can be substantially coaxial to one another. The first ring can comprise a plurality of first wedge-shaped elements. In embodiments disclosed herein, similarly to the first ring, the second ring comprises a plurality of second wedge-shaped elements. The first ring and the second ring are angularly displaceable one with respect to the other. Moreover, the first ring and the second ring are configured to move axially with respect to one another when the first ring and the second ring are angularly displaced one with respect to the other. The first wedge-shaped elements and second wedge-shaped elements are configured and arranged to co-act with one another.

Mutual co-action of the first wedge-shaped elements and second wedge-shaped elements can in general include mutual thrust in an axial direction, i.e. a direction substantially parallel to the ring axis, whereby the first wedge-shaped elements and the second wedge-shaped elements push the ones against the others in the axial direction. The first wedge-shaped elements and the second wedge-shaped elements can be configured to be maintained in mutual sliding contact relationship, e.g. by means of resilient members. The wedge-shaped elements can for instance have sliding surfaces, which can be inclined with respect to the rings axis and in the tangential direction, i.e. in a direction of extension of the rings around the axis. The inclination of the sliding surfaces causes the rings to be axially displaced one with respect to the other, i.e. to move closer or to be distanced from one another, as a consequence of the mutual angular displacement thereof.

Flow passages are defined between pairs of sequentially arranged first wedge-shaped elements and second wedge-shaped elements. I.e. a flow passage is defined between each pair consisting of one of the first wedge-shaped elements and one of the second wedge-shaped elements, arranged in sequence around the ring axis. The mutual axial and angular displacements of the first ring and second ring determine a variation of the cross-section of said flow passages, to modulate a fluid flow through the variable geometry assembly.

Flow modulation across the variable geometry assembly is thus obtained without the need for pivoting vanes. A simple, reliable and efficient flow modulating device is thus obtained.

The first sliding surfaces and the second sliding surfaces of the first wedge-shaped elements and second wedge-shaped elements can be smooth, such that the first ring and the second ring slide continuously one over the other when the angular displacement therebetween occurs.

According to some exemplary embodiments, the first and second wedge-shaped elements can be comprised of airfoil surfaces. Each flow passage can thus be formed between a first airfoil surface formed on the respective first wedge-shaped element and a second airfoil surface formed on the respective second wedge-shaped element.

In some embodiments, the first airfoil surface and the second airfoil surface can be configured to match with one another such as to close the respective flow passage formed therebetween, such that fluid flow can be entirely prevented when the first ring and second ring are in a closure position.

The variable geometry assembly can be configured such that fluid flows through the flow passages according to a radially inwardly oriented direction or else in a radially outwardly oriented direction. A radially inwardly directed flow can for instance be generated in case the variable geometry assembly is used in a centripetal turboexpander or turbine. A radially outwardly directed flow can be established in case the variable geometry assembly is used in a centrifugal compressor, and more specifically at the outlet of a centrifugal impeller, forming a vaned diffuser.

An actuator can be functionally coupled to at least one of the first ring and second ring and can be configured for angularly displacing the first ring and the second ring with respect to one another around the axis thereof.

Resilient members can be further provided to elastically bias the first ring and the second ring one against the other, such as to maintain the sliding surfaces in mutual contact with one another, for instance.

According to a further aspect, a turbomachine is disclosed herein, which includes a variable geometry assembly as described above. The turbomachine can comprise a casing and an impeller arranged in the casing for rotation around a rotation axis. In an embodiment, the impeller is substantially coaxial to the first ring and second ring. A radially oriented fluid passage can be provided in fluid communication with the impeller. The first ring and the second ring can be arranged in the radially oriented fluid passage.

One of the first ring and second ring of the variable geometry assembly can be axially constrained to the casing and angularly displaceable with respect to the casing, around the rotation axis of the impeller. The other ring can be angularly constrained to the casing and axially displaceable with respect to the casing in a direction parallel to the rotation axis of the impeller. In this way the mutual angular and axial displacements are distributed such that one ring is displaceable only in the angular direction, while the other ring is displaceable only in the axial direction.

Embodiments disclosed herein also concern a variable geometry turbomachine, which comprises a casing, at least one impeller arranged in the casing for rotation around a rotation axis and a variable geometry member or variable geometry assembly, arranged in a radially oriented fluid passage, in fluid communication with the impeller. The variable geometry assembly comprises a first ring and a second ring arranged substantially coaxial to the impeller. The first ring can comprise a plurality of first wedge-shaped elements facing the second ring, and the second ring can comprise a plurality of second wedge-shaped elements facing the first ring. Each first wedge-shaped element can comprise a first sliding surface in sliding contact with a respective second sliding surface of a corresponding one of said second wedge-shaped elements. The first ring and the second ring are angularly and axially displaceable with respect to one another. As understood herein, an angular displacement is a rotation around the rotation axis of the impeller of the turbomachine. As understood herein, an axial displacement is a displacement in a direction substantially parallel to the rotation axis of the impeller.

Features and embodiments are disclosed here below and are further set forth in the appended claims, which form an integral part of the present description. The above brief description sets forth features of the various embodiments of the present invention in order that the detailed description that follows may be better understood and in order that the present contributions to the art may be better appreciated. There are, of course, other features of the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein:

FIG. 11 illustrates a side view according to line XI-XI of FIG. 9;

FIG. 12 illustrates a sectional view according to line XII-XII of FIG. 11;

DETAILED DESCRIPTION OF THE INVENTION

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

Figure 1:
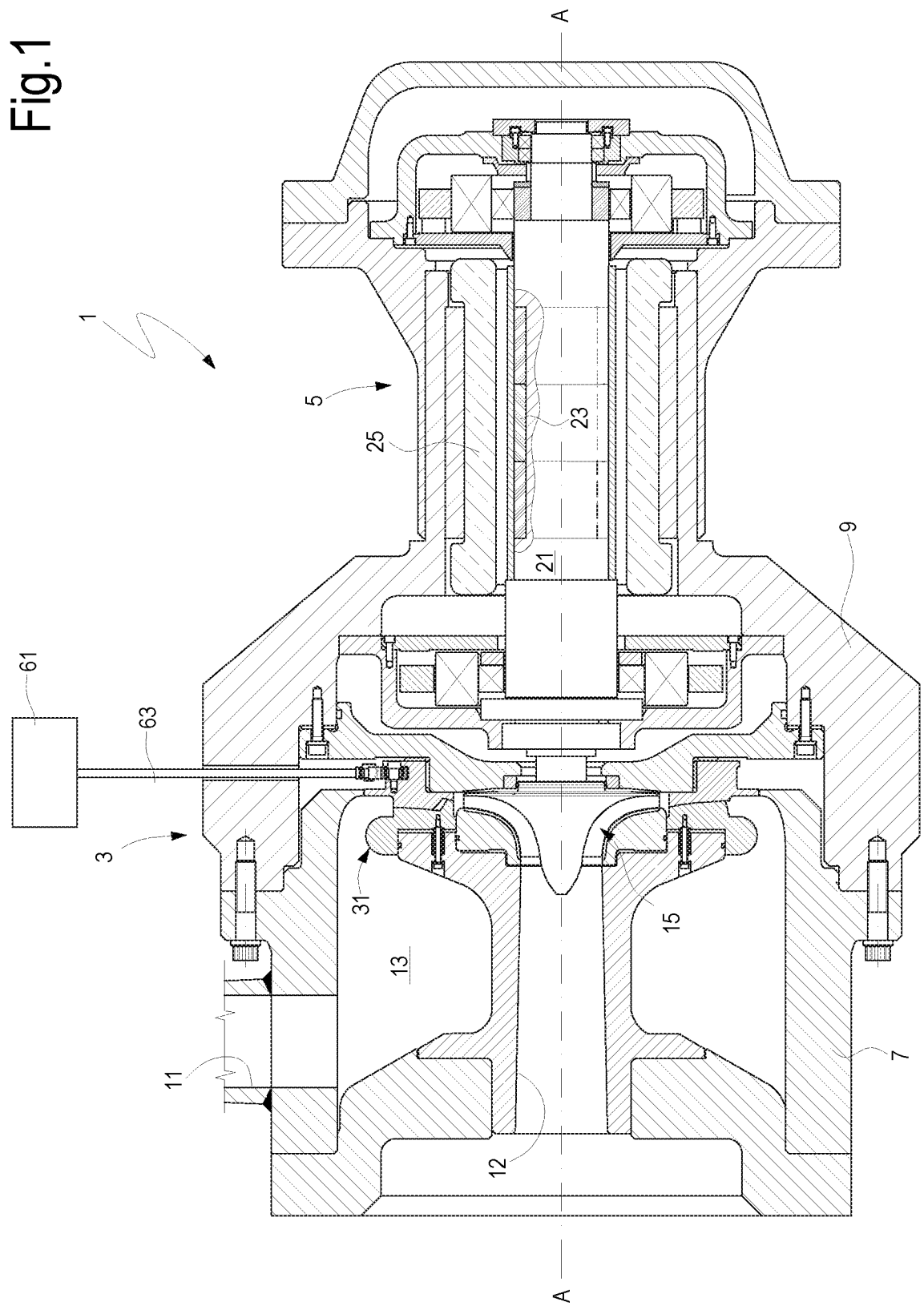
FIG. 1 illustrates a sectional view of a turboexpander and electric generator unit.
Figure 2:
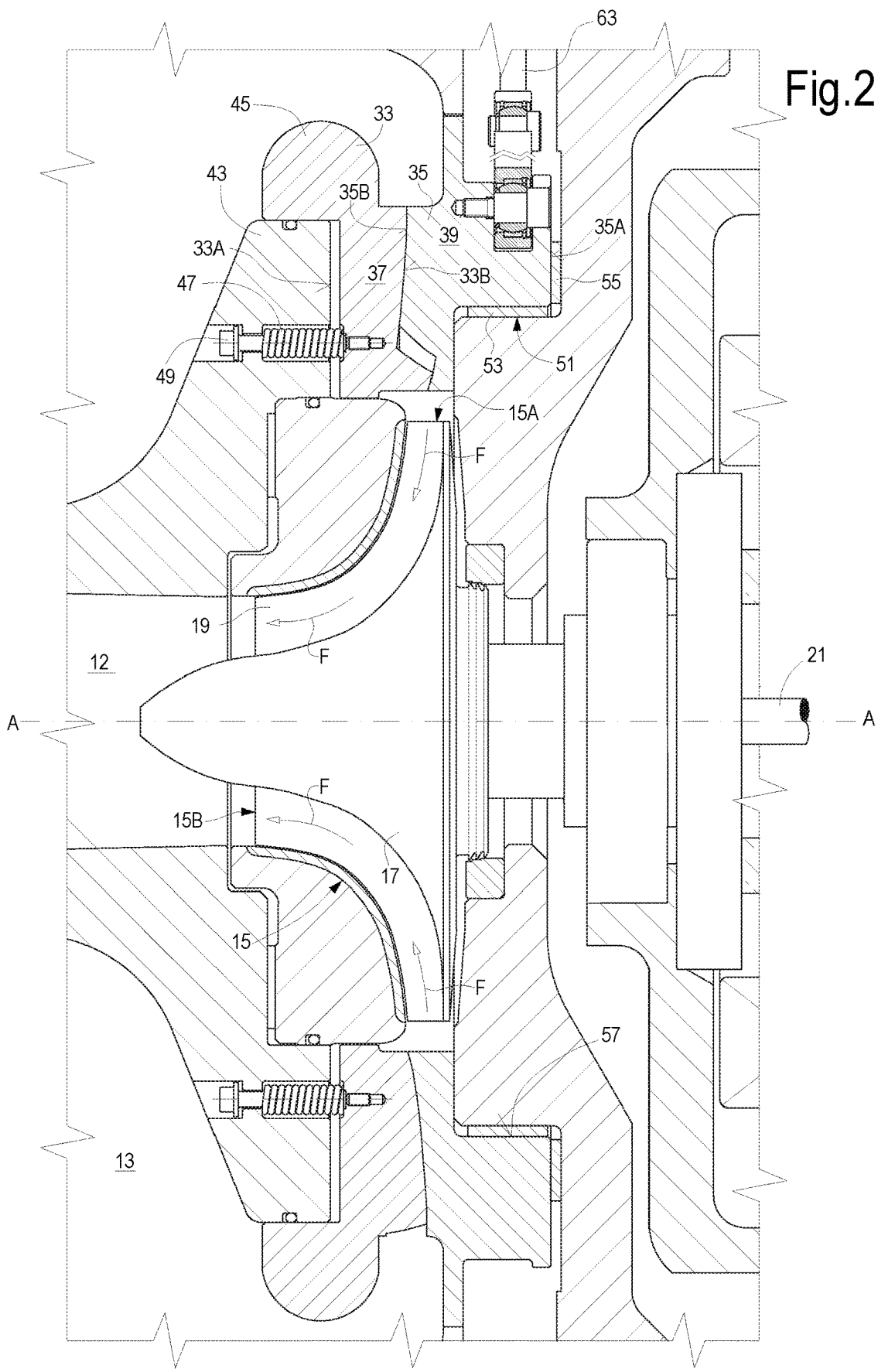
FIG. 2 illustrates an enlargement of a portion of FIG. 1.

FIGS. 1 and 2 illustrate sectional views of an exemplary variable geometry turbomachine according to the present disclosure. In this exemplary embodiment the turbomachine is a centripetal turboexpander, forming part of a turboexpander and generator unit. Mechanical power generated by the turboexpander is used to rotate an electric generator, which converts the mechanical power into electric power.

In other embodiments, the turboexpander can be drivingly coupled to a different rotating load, e.g. to a compressor or a pump. In some embodiments the turboexpander can be used to drive a compressor of a turbocharger for an internal combustion engine.

Referring now to FIGS. 1 and 2, a turboexpander-generator unit 1 is comprised of a turboexpander 3 and an electric generator 5. The turboexpander-generator unit 1 comprises a turboexpander casing 7 and a generator casing 9. The turboexpander casing 7 and the generator casing 9 can be rigidly coupled to one another to form a single body. The turboexpander-generator unit 1 can be used to convert stored energy of a process gas into electric energy. Turboexpander-generator units can be used in various applications, whenever compressed gas is available as a source of energy to drive the turboexpander. Possible applications of the turboexpander-generator unit 1 are in compressed air energy storage systems (CAES systems), waste gas energy recovery systems (WGER systems), pressure letdown stations (PLD stations), gas liquefaction systems, organic Rankine cycles (ORC), and the like.

The turboexpander casing 7 can comprise a gas inlet 11 and an axial gas outlet 12. The gas inlet 11 is fluidly coupled to an inlet plenum 13. The turboexpander 3 further comprises an impeller 15 arranged for rotation in the turboexpander casing 7 around a rotation axis A-A. The impeller 15 comprises a hub 17 and a plurality of blades or vanes 19 rigidly mounted on the hub 17 and extending therefrom. Gas flows (arrow F) through the impeller 15 in a centripetal direction, from a substantially radially oriented impeller inlet 15A, to a substantially axially oriented impeller outlet 15B (FIG. 2). While flowing through the impeller 15, the gas expands from an inlet pressure to a discharge pressure P2. The enthalpy drop of the gas through the impeller 15 is converted into mechanical power, which drives the impeller 15 into rotation around rotation axis A-A.

The impeller 15 is mounted on a shaft 21, which extends into the generator casing 9 and supports a rotor 23 of the electric generator 5. The rotor 23 is arranged coaxially in a stator 25 and is driven into rotation by the mechanical power generated by the turboexpander 3.

To control the operating conditions of the turboexpander 5, a variable geometry assembly is provided. The variable geometry assembly is mainly comprised of a variable geometry member 31 arranged around the rotation axis A-A, between the inlet plenum 13 and the impeller inlet 15A. The variable geometry member 31 is configured to adjust a flow passage between the inlet plenum 13 and the impeller 15, such as to adapt the gas flow rate flowing through the turboexpander 3 to variable operating conditions of the turboexpander.

With continuing reference to FIGS. 1 and 2, details of the variable geometry member 31 will now be described, reference being made to FIGS. 3A to 8.

The variable geometry member 31 can comprise a first ring 33 and a second ring 35. The first ring 33 and the second ring 35 are arranged substantially coaxially to one another and to the impeller 15, as shown in FIG. 2. In FIGS. 3A, 3B, and 4-8 the first ring 33 and the second ring 35 are shown in a somewhat simplified fashion, limited to the main elements thereof, which are actually used to adjust the gas flow passage, while additional structural details are shown in FIG. 2 only.

The first ring 33 has opposite first side 33A and second side 33B. The second side 33B faces the second ring 35 (see FIG. 2). The second ring 35 has in turn a first side 35A and a second side 35B, this latter facing the second side 33B of the first ring 33.

Figure 3A:
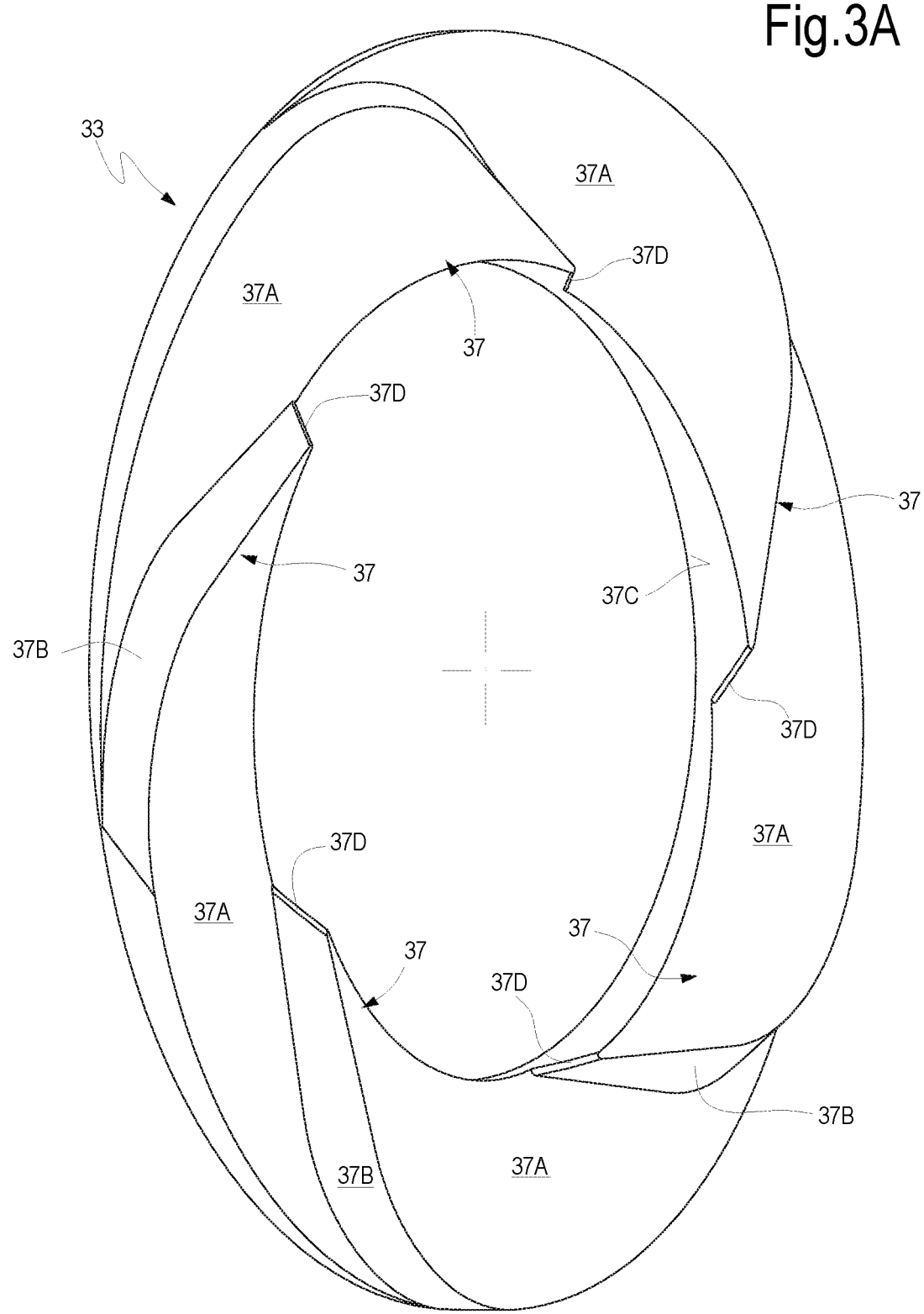
FIGS. 3A and 3B illustrate axonometric views of a first ring and a second ring of a variable geometry assembly of the turboexpander of FIGS. 1 and 2.
Figure 3B:
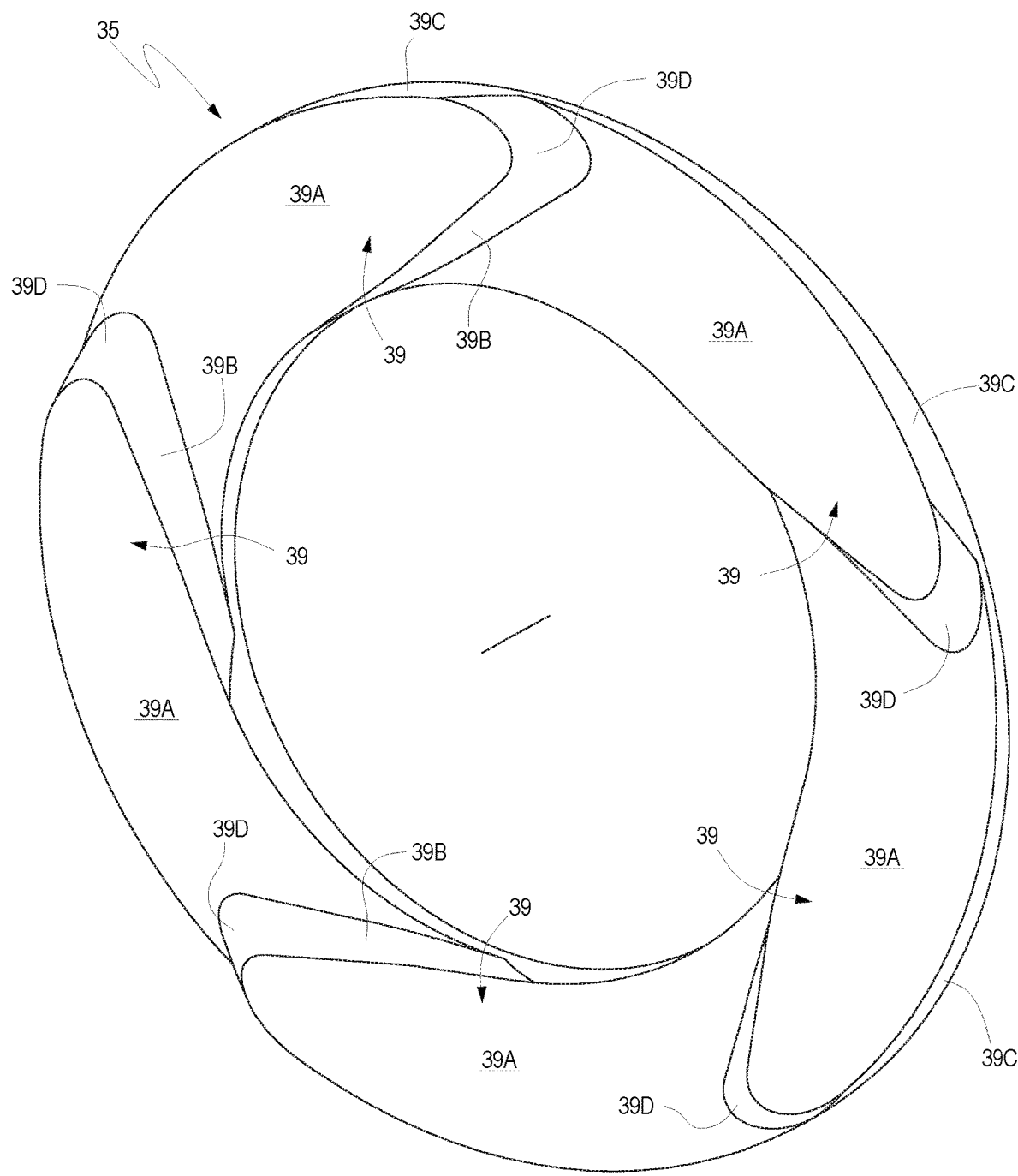

As best show in FIGS. 3A and 3B, the first ring 33 is provided with first wedge-shaped elements 37, facing the second ring 35. In the exemplary embodiment illustrated in the accompanying drawings, the first ring 33 is provided with five wedge-shaped elements 37, but as will become clear from the following description, the number of wedge-shaped elements can be different. Each first wedge-shaped element 37 projects from the side 33B of the first ring 33 and faces the second ring 35. Each first wedge-shaped element 37 is comprised of a respective first sliding surface 37A co-acting with the opposed second ring 35 in a manner to be described. Each first sliding surface 37A can be inclined with respect to a planar surface orthogonal to the rotation axis A-A both in the radial direction (as shown in the sectional view of FIG. 2) and in the tangential direction (as shown in the axonometric view of FIG. 3A and in the side view of FIG. 7).

Each first wedge-shaped element 37 is further comprised of side surfaces 37B and 37C. The side surface 37B is an airfoil surface which partly defines a gas flow passage as will be described later on. The side surface 37C is a substantially cylindrical surface coaxial to the rotation axis A-A of the impeller 15. The side surfaces 37B, 37C converge towards a trailing edge 37D facing towards the interior of the first ring 33.

Figure 4:
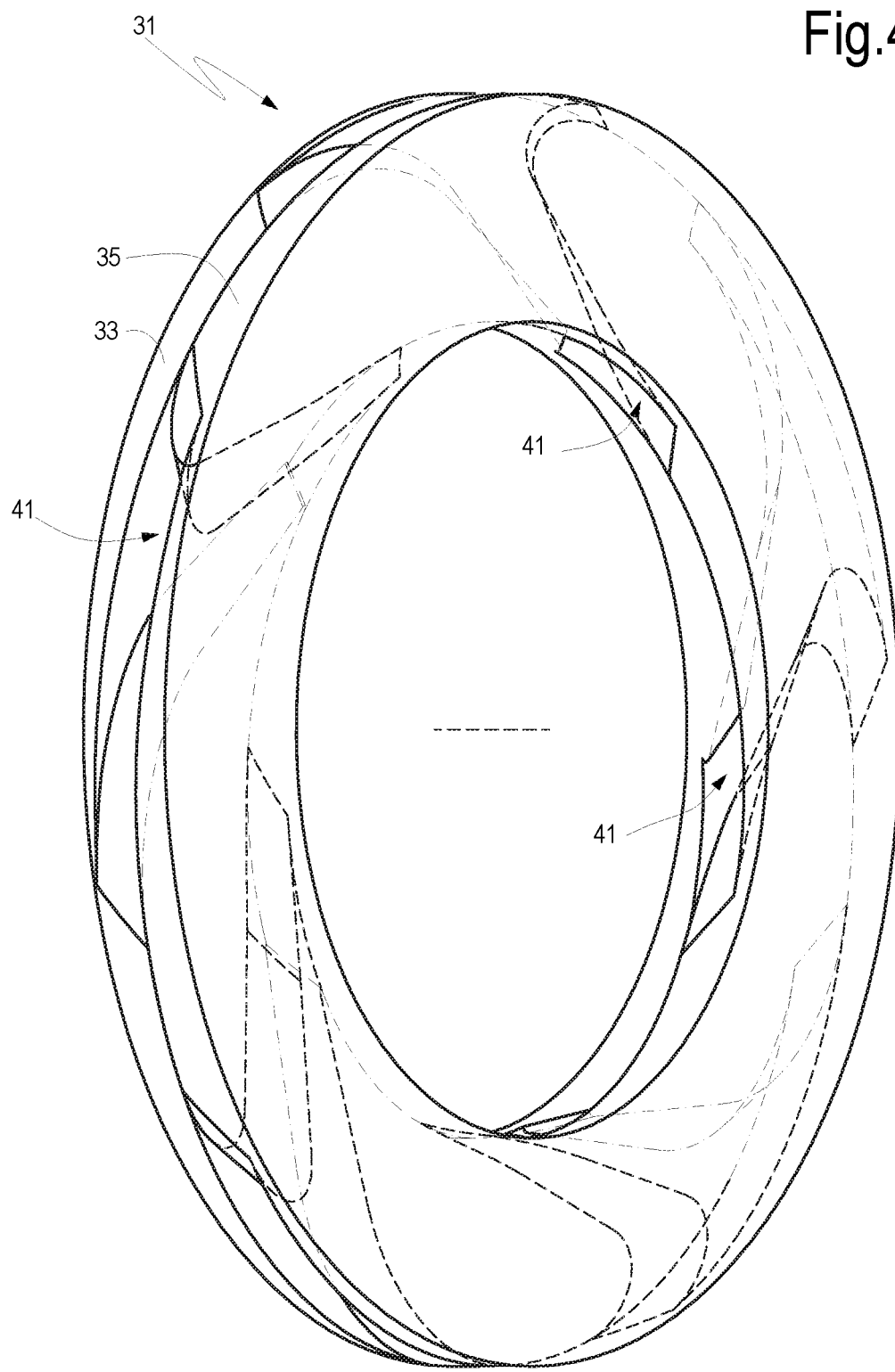
FIG. 4 illustrates an axonometric view of the variable geometry assembly.
Figure 5:
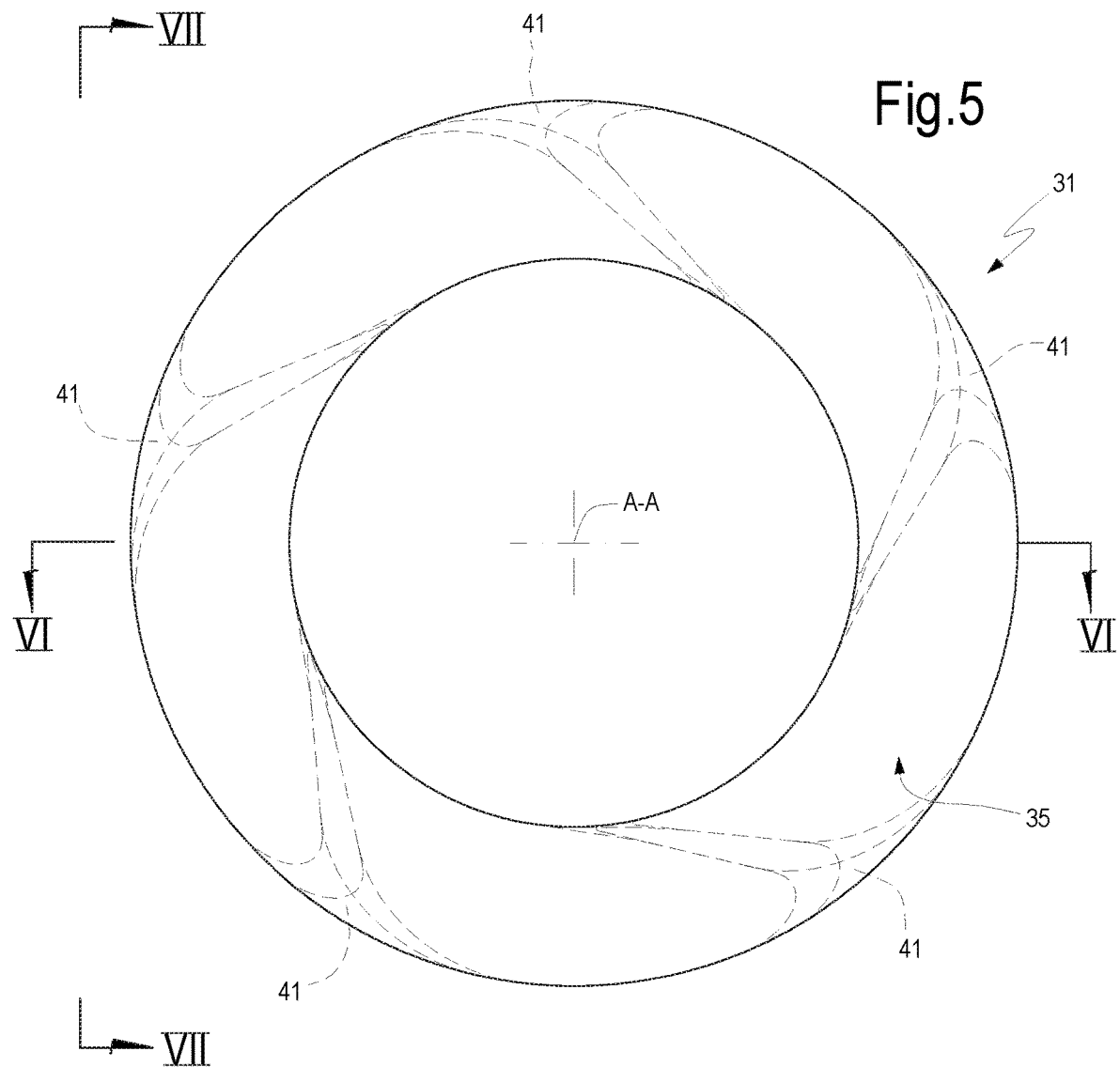
FIG. 5 illustrates a front view of the variable geometry assembly in a first position.
Figure 6:
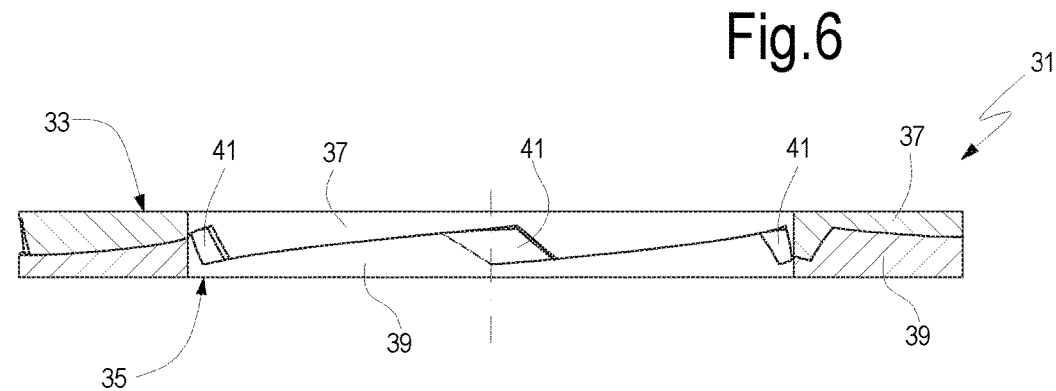
FIG. 6 illustrates a sectional view according to line VI-VI of FIG. 5.
Figure 7:
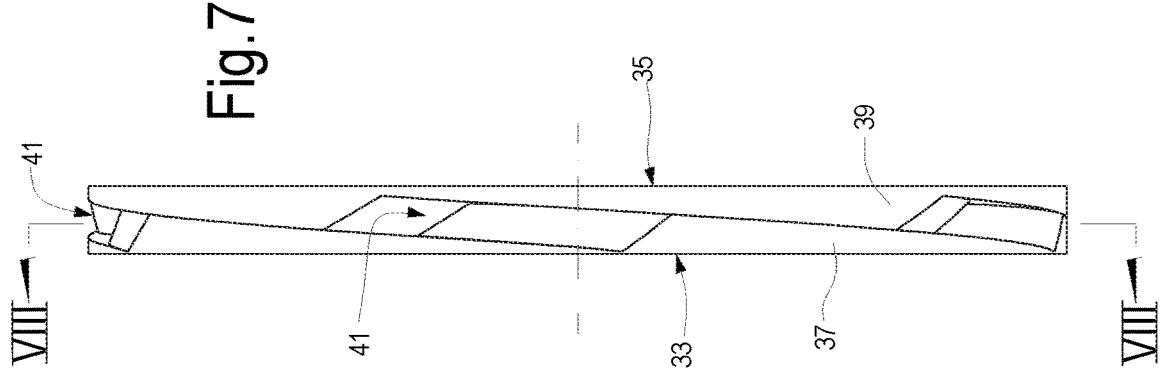
FIG. 7 illustrates a side view according to line VII-VII of FIG. 5.
Figure 8:
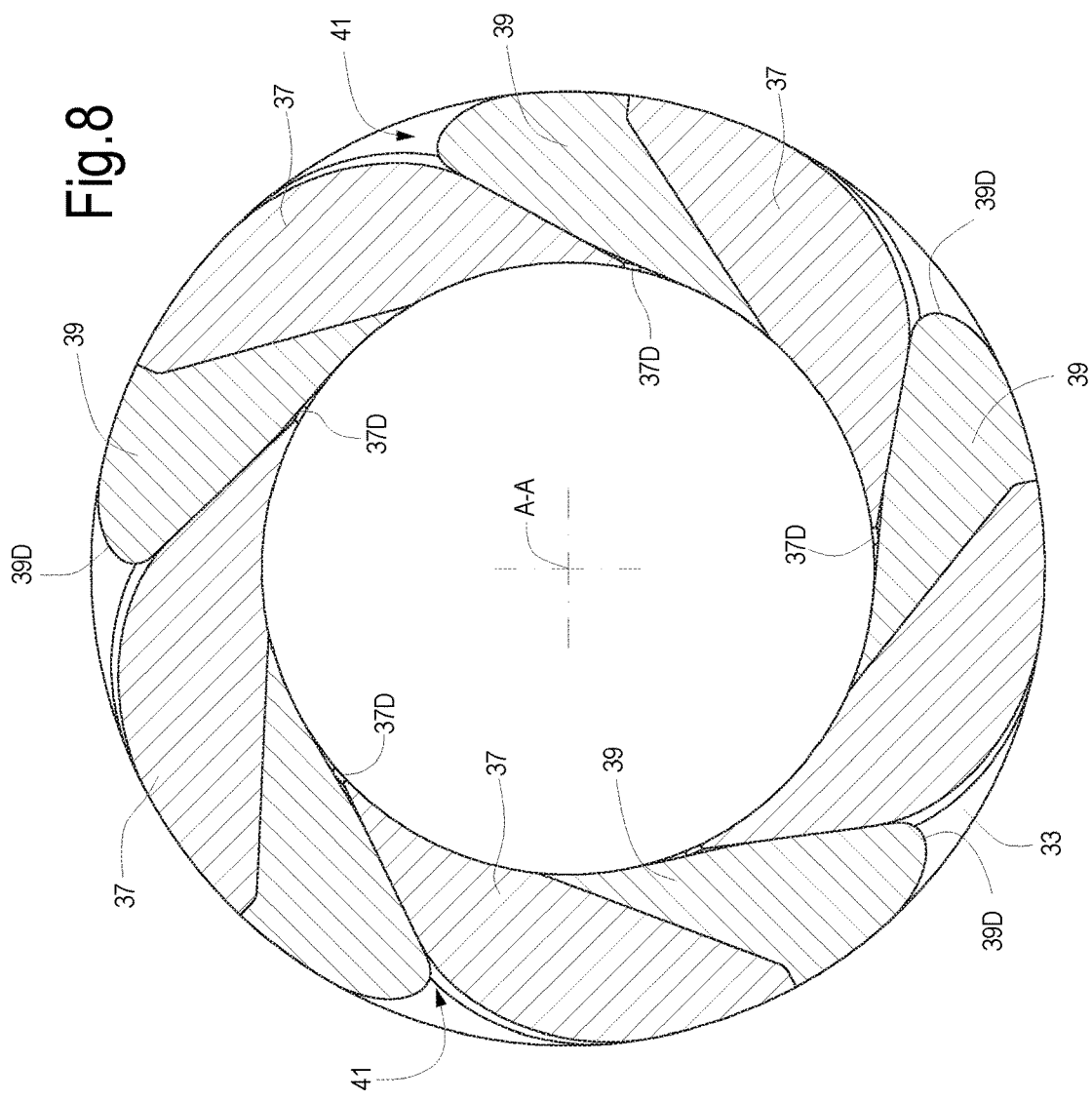
FIG. 8 illustrates a sectional view according to line VIII-VIII of FIG. 7.
Figure 9:
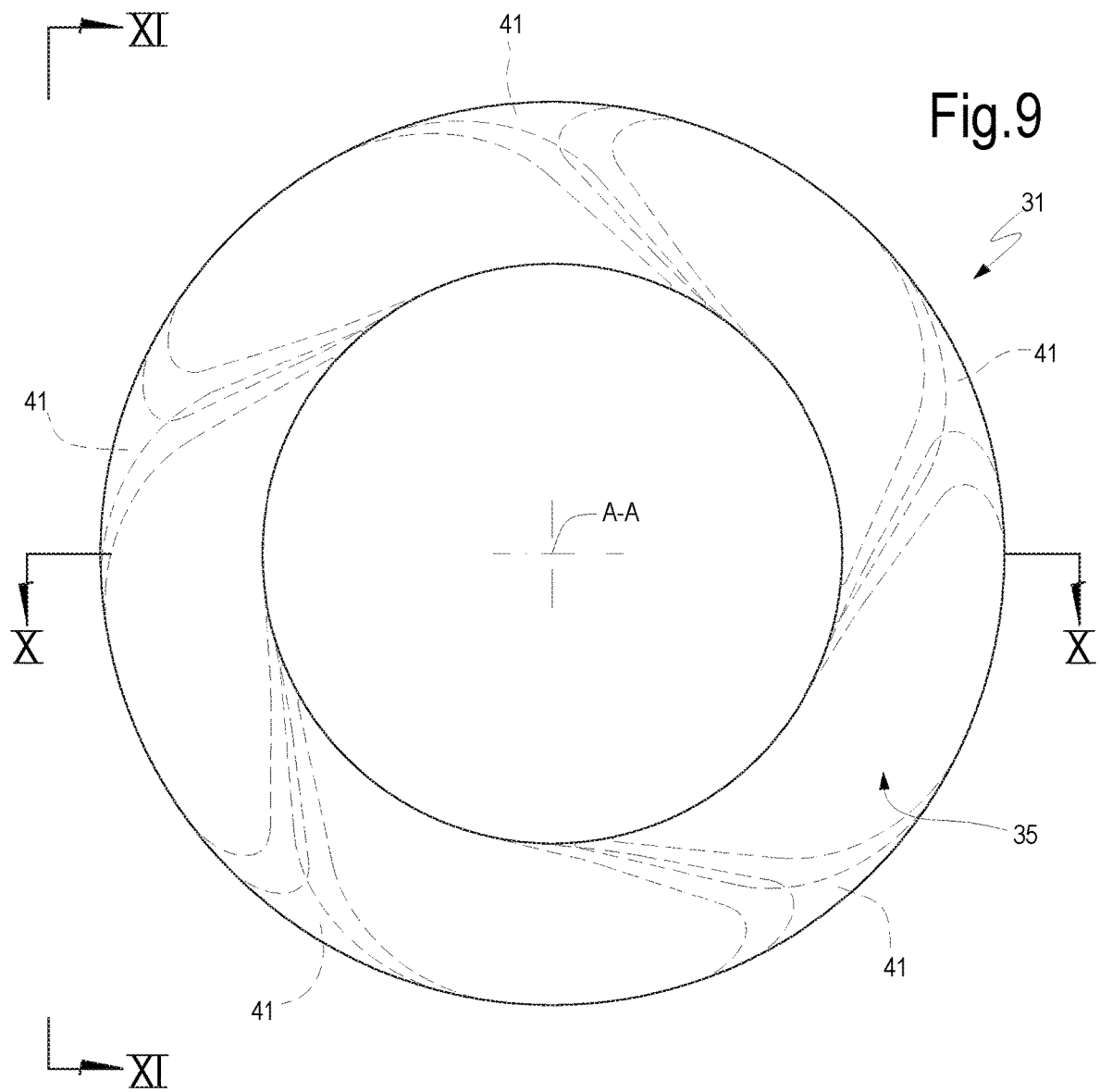
FIG. 9 illustrates a front view of the variable geometry assembly in a second position.
Figure 10:
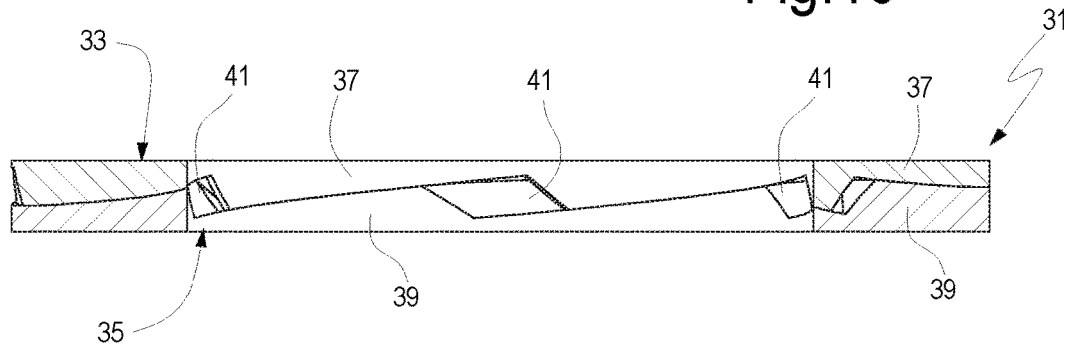
FIG. 10 illustrates a sectional view according to line X-X of FIG. 9.
Figure 13:
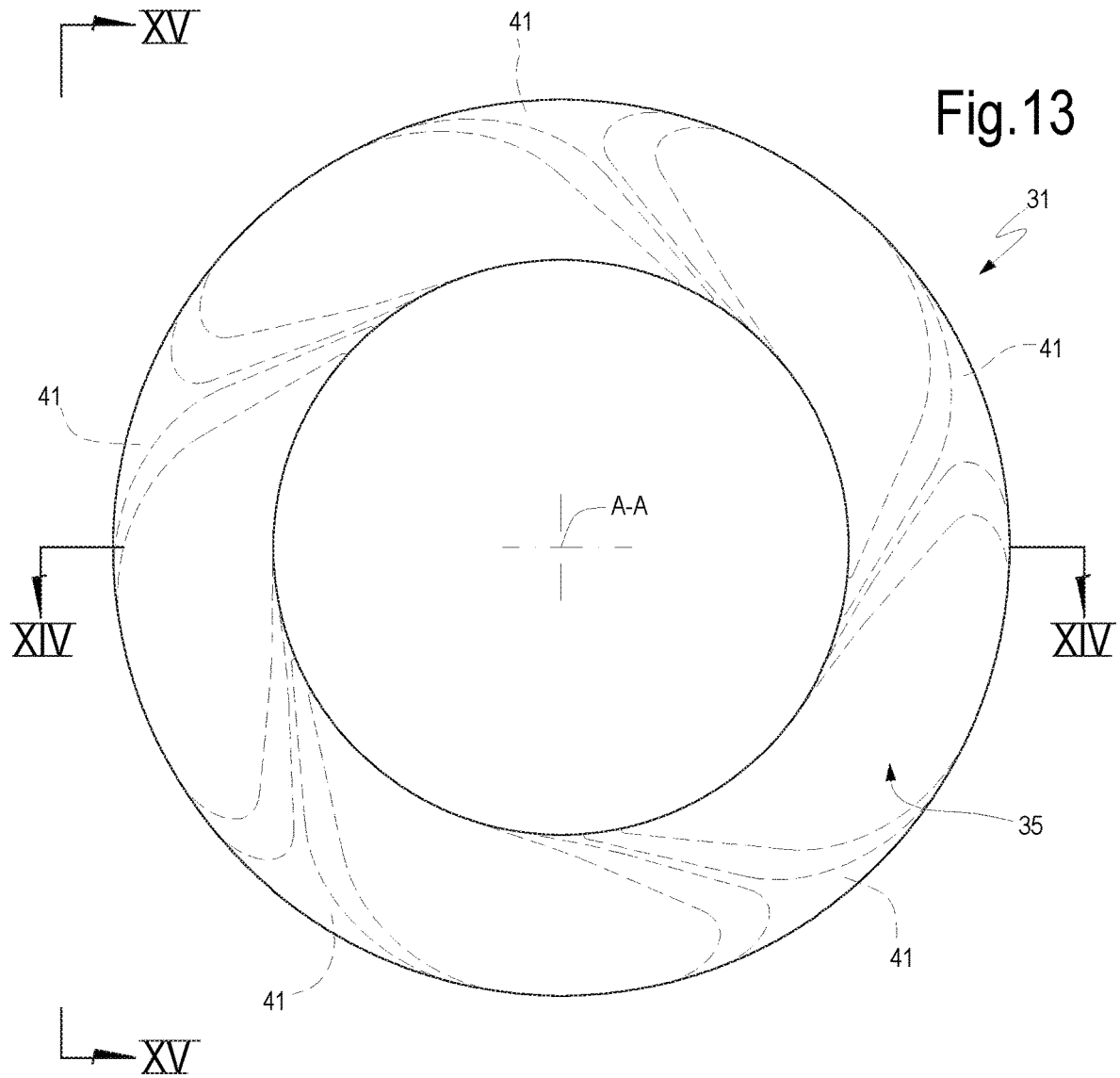
FIG. 13 illustrates a front view of the variable geometry assembly in a third position.
Figure 14:
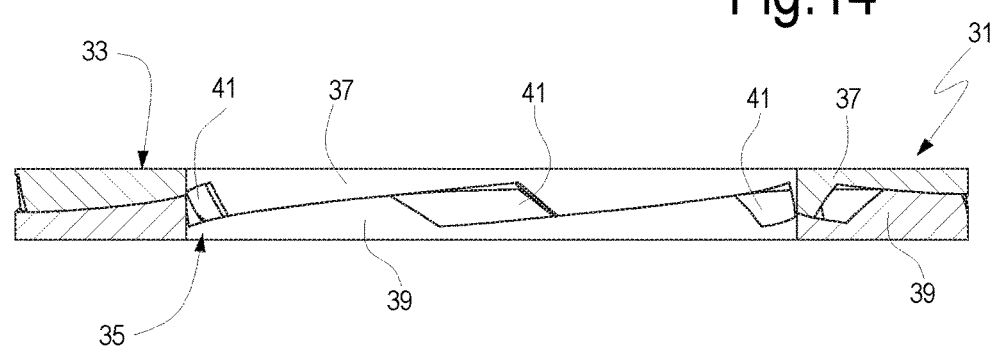
FIG. 14 illustrates a sectional view according to line XIV-XIV of FIG. 13.
Figure 15:
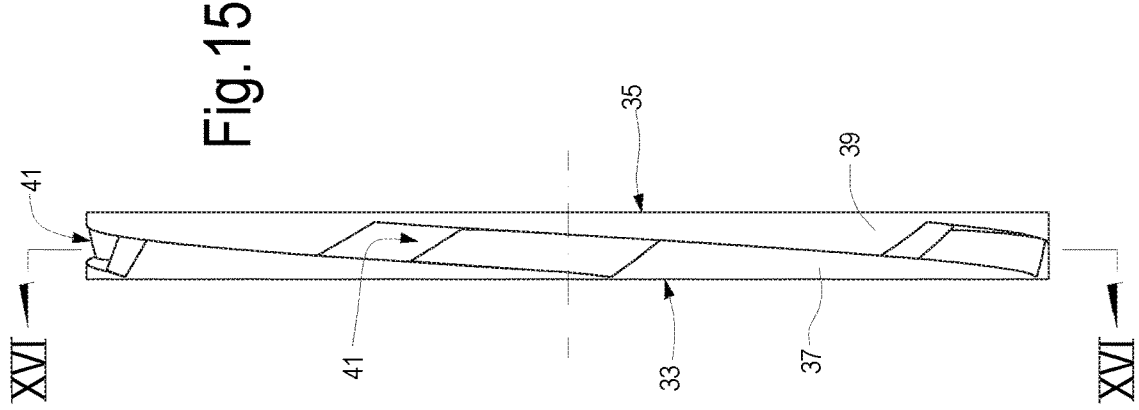
FIG. 15 illustrates a side view according to line XV-XV of FIG. 13.
Figure 16:
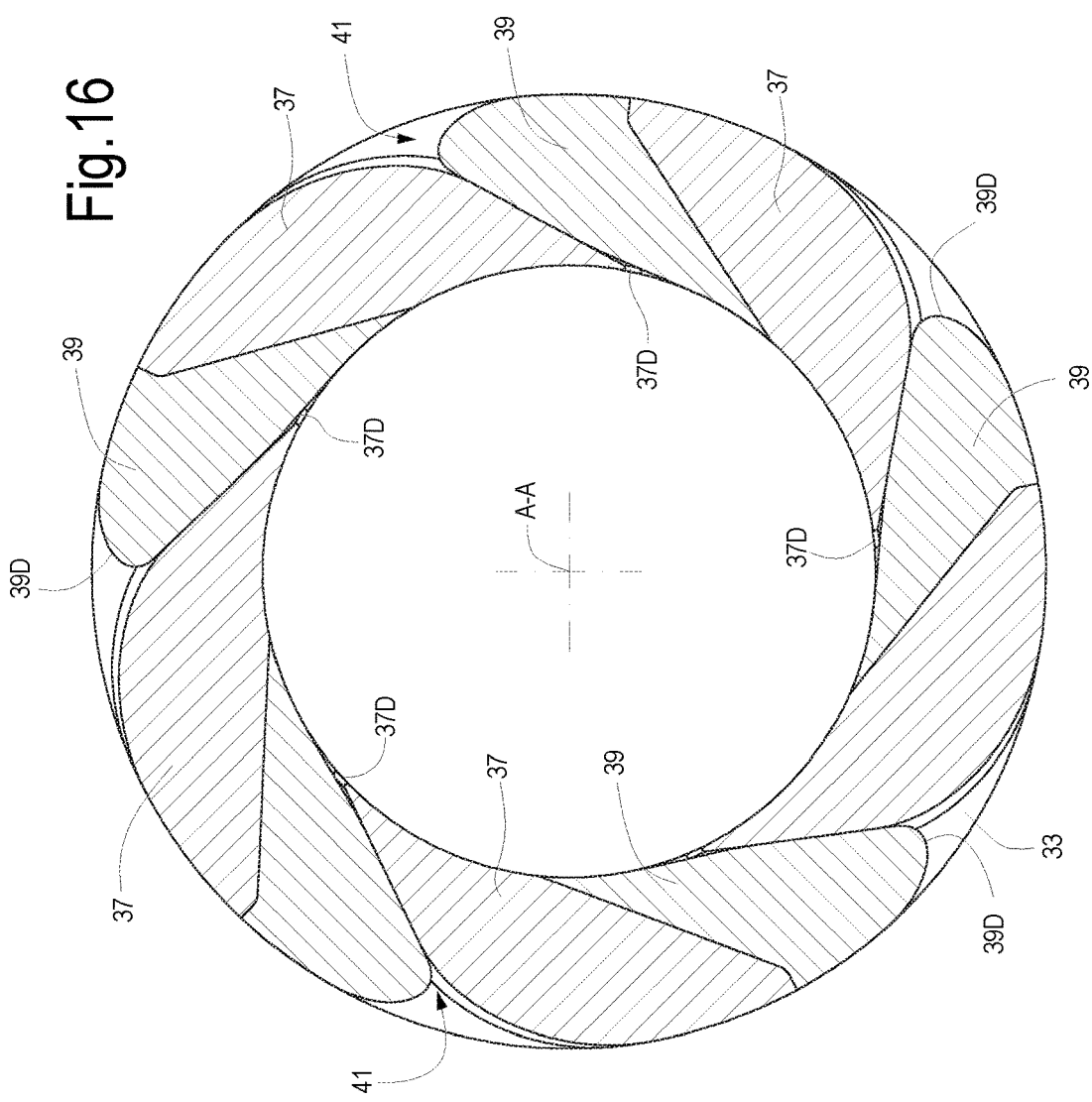
FIG. 16 illustrates a sectional view according to line XVI-XVI of FIG. 15.

The second ring 35 comprises a plurality of second wedge-shaped elements 39. The number of second wedge-shaped elements 39 is equal to the number of first wedge-shaped elements 37, i.e. five in the exemplary embodiment illustrated in FIGS. 3A-8. Each second wedge-shaped element 39 is comprised of a respective second sliding surface 39A co-acting with the opposed first ring 33. More specifically, as best shown in FIGS. 2 and 4, each first sliding surface 37A is in sliding contact with a corresponding second sliding surface 39A. Each second sliding surface 39A is inclined with respect to a planar surface orthogonal to the rotation axis A-A both in the radial direction (see FIG. 2) and in the tangential direction (see FIGS. 3B and 7).

Each second wedge-shaped element 39 is further comprised of side surfaces 39B and 39C. The side surface 39B is an airfoil surface which partly defines a gas flow passage as will be described later on. The side surface 39C is a substantially cylindrical surface coaxial to the rotation axis A-A of the impeller 15. The side surfaces 39B, 39C converge towards a rounded, outwardly oriented leading edge 39D of ring 35.

As best shown in FIG. 4, a respective gas flow passage 41 is formed between each pair of sequentially arranged first wedge-shaped element 33 and second wedge-shaped element 35. Each flow passage 41 is defined between airfoil surfaces 37B and 39B and portions of opposing first slide surface 37A and second slide surface 39A. The leading edges 39D are arranged at the inlet of each flow passage 41 and the trailing edges 37D are arranged at the outlet of each flow passage 41. As will be explained in more detail later on, the cross-section of the flow passages 41 can be augmented or reduced, or the flow passages 41 can be completely closed, by angularly and axially displacing the first ring 33 and the second ring 35 one with respect to the other.

In the embodiment disclosed herein, the first ring 33 and the second ring 35 are mounted in the turboexpander casing 7 such that the first ring 33 is displaceable in an axial direction parallel to the rotation axis A-A, but angularly stationary with respect to the turboexpander casing 7. Conversely, the second ring 35 is displaceable angularly around the rotation axis A-A, but is axially stationary with respect to the turboexpander casing 7.

According to some embodiments, the first ring 33 is mounted around a stationary flange 43 integral with the turboexpander casing 7. The first ring 33 can be provided with an outer annular ridge 45, shown in FIG. 2 but omitted in FIGS. 3A-16 for the sake of simplicity. The annular ridge 45 surrounds the flange 43 and can slide with respect to the flange 43 in an axial direction, i.e. in a direction substantially parallel to the rotation axis A-A. A plurality of resilient biasing members 47 can be arranged between the first side 33A of the first ring 33 and the flange 43. For instance helical compression springs can be used. In other embodiments, not shown, Belleville springs or other resilient members can be used instead of, or in combination with helical springs.

The resilient biasing members 47 push the first ring 33 against the second ring 35, such that the first sliding surfaces 37A and the second sliding surfaces 39A are maintained in mutual pressure contact with one another. Guide rods 49 can be provided to allow an axial displacement of the first ring 33 in a direction parallel to rotation axis A-A, and to prevent any angular movement thereof around said axis. This latter function could be achieved, in other embodiments, via a reference pin in combination with guide pins. The guide rods can also be used for mounting and retaining the resilient biasing members 47 in their correct position between the first ring 33 and the flange 43.

The second ring 35 can be rotationally supported on a stationary boss 51 integrally formed in the turboexpander casing 7. A radial anti-friction bushing 53 and an axial anti-friction bushing 55 can rotationally and axially support the second ring 35 on the stationary boss 51. The second ring 35 can be provided with an annular groove 57 (shown in FIG. 2 and omitted in the remaining figures for the sake of simplicity), wherein the stationary boss 51 projects. The second ring 35 can be angularly displaced around the rotation axis A-A under the control of an actuator 61, which is connected to the second ring 35 by a connecting rod 63.

Due to the first and second wedge-shaped elements 37 and 39, which are in mutual sliding contact through the sliding surfaces 37A and 39A, when the second ring 35 is angularly displaced around the rotation axis A-A, the first ring 33 is forced to move axially away from the second ring 35 against the resilient force of the resilient biasing members 47. The combined angular and axial displacement of the first ring 33 and second ring 35 one with respect to the other modifies the geometry of the variable geometry member 31 as can be best understood by comparing FIGS. 5 to 16. The displacement of the two rings causes a variation of the cross-sectional flow passages 41 defined by the variable geometry member 31.

FIGS. 5 to 8 illustrate views of the variable geometry member 31 in a first position, in which the flow passages 41 defined between the wedge-shaped elements 37 and 39 are closed. The airfoil surfaces 39B of second wedge-shaped elements 39 are in contact with the airfoil surfaces 37B of first wedge-shaped elements 37, such that the flow passages 41 are closed.

FIGS. 9 to 12 illustrate the same views of FIGS. 5 to 8, but with the two rings 33, 35 in a slightly different mutual angular position. More specifically, the second ring 35 is displaced by 5° with respect to the position of FIGS. 5 to 8. Mutually corresponding pairs of airfoil surfaces 37B, 39B are slightly distanced from one another such that the flow passages 41 formed between pairs of adjacent wedge-shaped elements 37, 39 are slightly open. The wedge shape of the wedge-shaped elements 37, 39 causes the two rings 33, 35 to be slightly moved apart from one another as a consequence of their mutual angular displacement.

To further increase the total cross section of the flow passages 41 the two rings 33, 35 can be further displaced angularly one with respect to the other, e.g. by 10°, as shown in FIGS. 13 to 16. A further rotation of the second ring 35 with respect to the first ring 33 will further open the flow passages 41 for increased flow rates. The additional angular displacement has caused a further axial movement between the rings 33, 35, which are further distanced from one another.

The operating condition of the turboexpander 7 can thus be adjusted by simply rotating one rigid member (ring 35) and by slightly shifting another rigid member (ring 33) in an axial direction.

In the above described embodiment the variable geometry member 31 is arranged at the inlet of a centripetal impeller 15 of a turboexpander 7. A similar variable geometry member can be used in other turbomachine arrangements, where a similar need exists for adjusting flow passages as a function of the operating conditions of the turbomachine.

Figure 17:
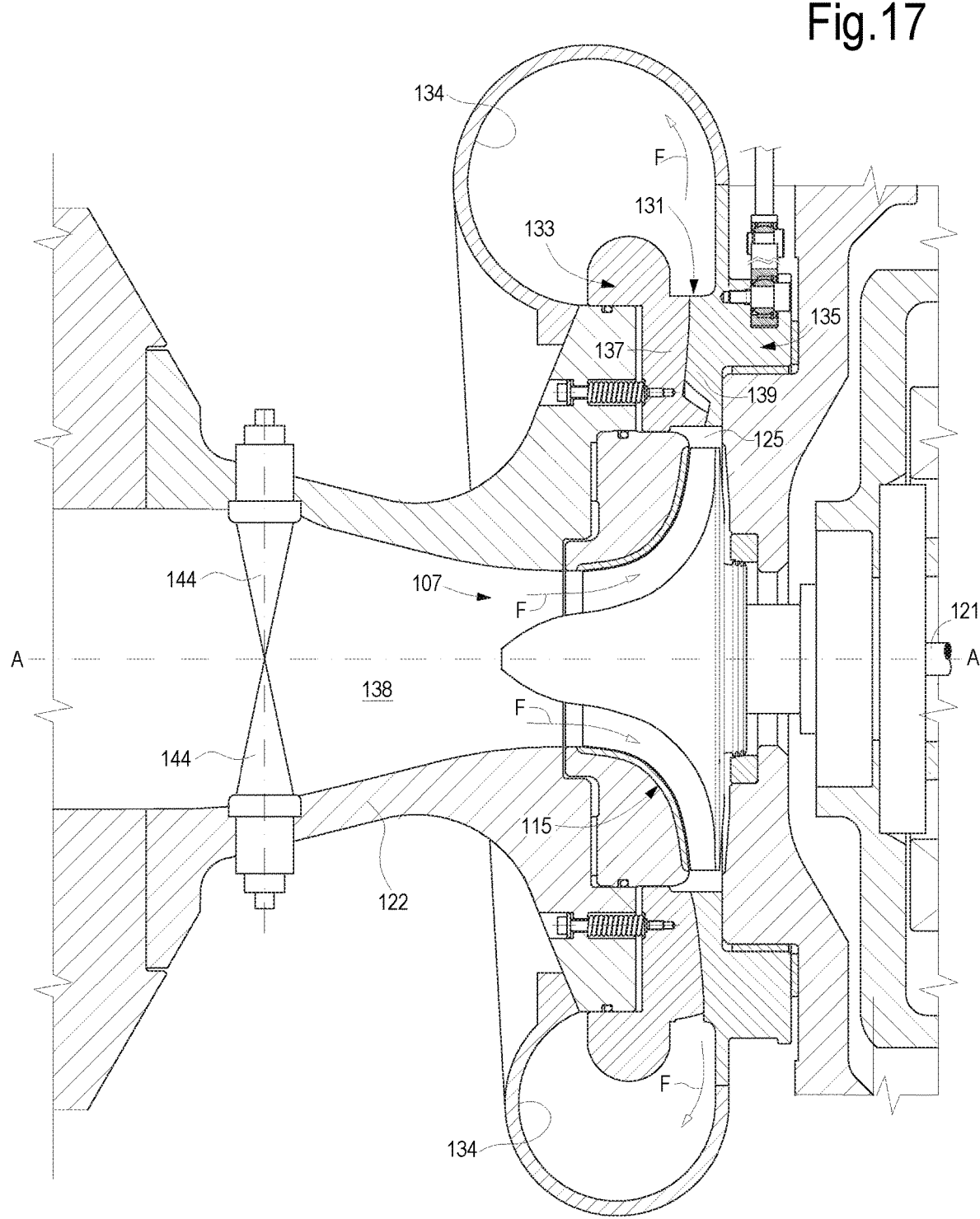
FIG. 17 illustrates a sectional view of a centrifugal compressor comprising a variable geometry assembly according to the present disclosure.

For instance, FIG. 17 schematically shows a centrifugal compressor 107, with a vaned diffuser. The centrifugal compressor 107 comprises an impeller 115 mounted for rotation on a shaft 121 arranged in a casing 122. Gas entering the impeller 115 (arrow F) is accelerated by the rotating blades of the impeller 115 and the kinetic energy thus imparted to the gas is converted into pressure energy in a diffuser 125.

A variable geometry assembly comprised of a variable geometry member 131 is arranged around a radial outlet of the impeller 115. The variable geometry member 131 can be configured in a manner similar to the above described variable geometry member 31. For instance, the variable geometry member 131 can be comprised of a first ring 133 and a second ring 135, each provided with respective first and second wedge-shaped elements 137, 139, similar to wedge-shaped elements 37 and 39, and not shown in detail. The wedge-shaped elements 137, 139 of first ring 133 and second ring 135 define flow passages through which the accelerated gas flows from the impeller outlet into a scroll 134, wherefrom the gas flows in a delivery duct (not shown).

The position of the two rings 133, 135 can be adjusted depending upon the operating conditions of the compressor 107. The wedge-shaped elements 137, 139 of the two rings 133, 135 act in a way similar to variable diffuser vanes of centrifugal compressors of the current art. The wedge-shaped elements 137, 139 may be different in shape from wedge-shaped elements 37, 39, in view of the different flow conditions through the flow passages defined between consecutively arranged wedge-shaped elements 137, 139. While in FIGS. 1 to 16 the fluid flows in a centripetal direction through the variable geometry member 31, in FIG. 17 the fluid flows in a centrifugal direction through the variable geometry member 131 and therefore the leading edges of the wedge-shaped elements are facing inwardly towards the rotation axis A-A of the impeller 115 and the trailing edges are oriented outwardly.

The compressor 107 can also be provided with variable inlet guide vanes 144 arranged in an axial inlet plenum positioned upstream of the impeller 115. The angular position of the variable inlet guide vanes 144 can be adjusted in a way known to those skilled in the art, to adjust the gas flow conditions, in combination with an adjustment operated by the variable geometry member 131. The use of a radial inlet plenum with radially arranged variable inlet vanes is not excluded, in which case a variable geometry member similar to member 31 or 131 can be used at the inlet of the compressor 107.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments.

I claim:

1. A variable geometry assembly comprising:
   a first ring comprising a plurality of first wedge-shaped elements and arranged along an axis; and
   a second ring comprising a plurality of second wedge-shaped elements and arranged along the axis, the second ring being substantially coaxial to the first ring, the second wedge-shaped elements co-acting with the first wedge-shaped elements;
   a guide rod configured to prevent angular displacement of the first ring around the axis; and
   a stationary boss configured to prevent movement of the second ring along the axis,
   wherein flow passages are defined between pairs of sequentially arranged first wedge-shaped elements and second wedge-shaped elements, the first ring and the second ring are angularly displaceable one with respect to the other, the first ring and the second ring are configured to move axially with respect to one another when the first ring and the second ring are angularly displaced one with respect to the other, and
   wherein (i) each of the first wedge-shaped elements defines a respective first sliding surface and a respective trailing edge at the outlet of a respective one of the flow passages, and are arranged in an overlapping configuration such that the trailing edge of each of the first wedge-shaped elements rests on the respective first sliding surface of an adjacent one of the first wedge-shaped elements; and (ii) each of the second wedge-shaped elements defines a respective second sliding surface and a respective leading edge at the inlet of a respective one of the flow passages, and are arranged in an overlapping configuration such that the leading edge of each of the second wedge-shaped elements rests on the respective second sliding surface of an adjacent one of the second wedge-shaped elements.

2. The variable geometry assembly of claim 1, wherein each of the respective first sliding surfaces of a corresponding one of said first wedge-shaped elements is in sliding contact with a respective one of the second sliding surfaces of a corresponding one of the second wedge-shaped elements.

3. The variable geometry assembly of claim 2, wherein the first sliding surfaces and the second sliding surfaces are smooth such that the first ring and the second ring slide continuously one over the other when the angular displacement therebetween occurs.

4. The variable geometry assembly of claim 1, wherein each flow passage is formed between a first airfoil surface formed on the respective first wedge-shaped element and a second airfoil surface formed on the respective second wedge-shaped element.

5. The variable geometry assembly of claim 4, wherein the first airfoil surface and the second airfoil surface are configured to match with one another such as to close the respective flow passage formed therebetween in an angular closing position of the first ring and second ring.

6. The variable geometry assembly of claim 1, wherein the trailing edges are facing radially inwardly towards the axis of the first ring and second ring and the leading edges are facing radially outwardly away from said axis.

7. The variable geometry assembly of claim 1, wherein the leading edges are facing radially inwardly towards the axis of the first ring and second ring and the trailing edges are facing radially outwardly away from the axis.

8. The variable geometry assembly of claim 1, further comprising an actuator functionally coupled to at least one of the first ring and second ring, and configured for angularly displacing the first ring and the second ring with respect to one another around the axis thereof.

9. The variable geometry assembly of claim 1, further comprising resilient members elastically biasing the first ring and the second ring one against the other.

10. A turbomachine comprising:
a variable geometry assembly for modulating a fluid flow in the turbomachine, the variable geometry assembly comprising:
   a first ring comprising a plurality of first wedge-shaped elements and arranged along an axis; and
   a second ring comprising a plurality of second wedge-shaped elements and arranged along the axis, the second ring being substantially coaxial to the first ring, the second wedge-shaped elements co-acting with the first wedge-shaped elements;
a guide rod configured to prevent angular displacement of the first ring around the axis; and
a stationary boss configured to prevent movement of the second ring along the axis,
wherein flow passages are defined between pairs of sequentially arranged first wedge-shaped elements and second wedge-shaped elements, the first ring and the second ring are angularly displaceable one with respect to the other, the first ring and the second ring are configured to move axially with respect to one another when the first ring and the second ring are angularly displaced one with respect to the other, and
wherein (i) each of the first wedge-shaped elements defines a respective first sliding surface and a respective trailing edge at the outlet of a respective one of the flow passages, and are arranged in an overlapping configuration such that the trailing edge of each of the first wedge-shaped elements rests on the respective first sliding surface of an adjacent one of the first wedge-shaped elements; and (ii) each of the second wedge-shaped elements defines a respective second sliding surface and a respective leading edge at the inlet of a respective one of the flow passages, and are arranged in an overlapping configuration such that the leading edge of each of the second wedge-shaped elements rests on the respective second sliding surface of an adjacent one of the second wedge-shaped elements.

11. The turbomachine of claim 10 further comprising:
a casing;
an impeller arranged in the casing for rotation around a rotation axis; and
a radially oriented fluid passage in fluid communication with the impeller;
wherein the first ring and the second ring are arranged in the radially oriented fluid passage substantially coaxially to the impeller.

12. The turbomachine of claim 11, wherein one of the first ring and second ring of the variable geometry assembly is axially constrained to the casing and angularly displaceable around the rotation axis, and the other of the first ring and second ring is angularly constrained to the casing and axially displaceable parallel to the rotation axis.

13. The turbomachine of claim 11, wherein the impeller comprises a substantially radially oriented impeller inlet and a substantially axially oriented impeller outlet, the turbomachine being configured as a centripetal expander or turbine; and wherein the variable geometry assembly is arranged at the substantially radially oriented impeller inlet to regulate the flow entering the impeller.

14. The turbomachine of claim 11, wherein the impeller comprises a substantially axially oriented impeller inlet and a substantially radially oriented impeller outlet, the turbomachine being configured as a centrifugal compressor; and wherein the variable geometry assembly is arranged at the substantially radially oriented impeller outlet, forming a vaned compressor diffuser.

15. The turbomachine of claim 10, wherein each of the respective first sliding surfaces of a corresponding one of said first wedge-shaped elements is in sliding contact with a respective one of the second sliding surfaces of a corresponding one of the second wedge-shaped elements.

16. The turbomachine of claim 15, wherein the first sliding surfaces and the second sliding surfaces are smooth such that the first ring and the second ring slide continuously one over the other when the angular displacement therebetween occurs.

* * * * *